June 19, 1962 S. A. MASON 3,040,290
WIRING DEVICE

Filed July 10, 1959 2 Sheets-Sheet 1

WITNESSES
John C. Heasley, Jr.
Edward F. Possessky

INVENTOR
Stuart A. Mason
BY
Donald Smith
ATTORNEY

United States Patent Office 3,040,290
Patented June 19, 1962

3,040,290
WIRING DEVICE
Stuart A. Mason, Huntington, Conn., assignor to The Bryant Electric Company, Bridgeport, Conn., a corporation of Connecticut
Filed July 10, 1959, Ser. No. 826,171
2 Claims. (Cl. 339—164)

The present invention relates to electrical wiring devices, and more particularly to receptacles that serve to interconnect electrical plugs with electrical conductors for the transfer of electrical energy therebetween.

Gainful employment of electrical energy is accomplished after its transmission over conducting mediums to points where it is to be converted into other forms of useful energy. Although there are a great variety of conducting mediums, metallic conductors ordinarily in the form of wires are utilized to transmit electrical energy from source points to points of utilization. A desired distribution of electrical energy from a source point may be established through the use of a prescribed network of wires, wherein wiring devices can connect successive wires and thereby provide a variety of control functions for the mentioned distribution of electrical energy.

The structure of any wiring device is made to satisfy those control functions to be provided by the device and, in general, cost considerations. It is to be noted, however, that it is often difficult to provide wiring device structures for which costs are reduced and in which a desired functionality exists. For example, if a wire is to connected to an electrical wiring device, which has some given function, means must be provided in the device for engaging the wire in a manner consistent with economic objectives. The wiring device means for electrical and mechanical engagement of a wire can be provided by a variety of structures, of which one particular variety is a screw-type terminal device.

Thus, it is an object of the invention to provide a novel wiring device having improved means for engaging wires.

It is a further object of the invention to provide a novel electrical receptacle having an improved screw-type terminal for engagement of wires.

It is an additional object of the invention to provide a novel electrical wiring device, including an improved screw type terminal, in which a unique construction affords simplicity and economy consistent with intended functionality.

These and other objects of the invention will become more apparent upon consideration of the following detailed description of an illustrative embodiment of the invention as related to the accompanying drawings, in which.

In accordance with the broad principles of the invention, a wiring device comprises an integral housing that receives and readily engages terminal members having improved screw-type wire engaging means. The screw-type wire engaging means is operable in such a manner that a strong electrical connection is facilely established with an inserted wire, yet is structurally related to the remainder of the wiring device so that overall costs are reduced through simplified assembly.

Although the illustrated electrical receptacle will be described to point out the invention, other wiring devices having modified structures can equivalently be constructed in accordance with the principles of the invention. The detailed description, therefore, is to be made only for ilustrative purposes with an understanding that the principles of the invention are not to be limited thereby.

Figure 1:
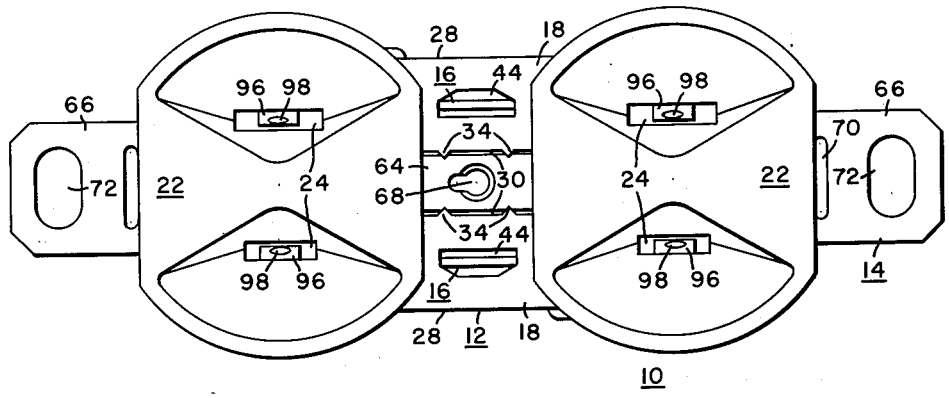
FIG. 1 is a top plan view of an assembled receptacle including a terminal constructed in accordance with the principles of the invention.
Figure 2:
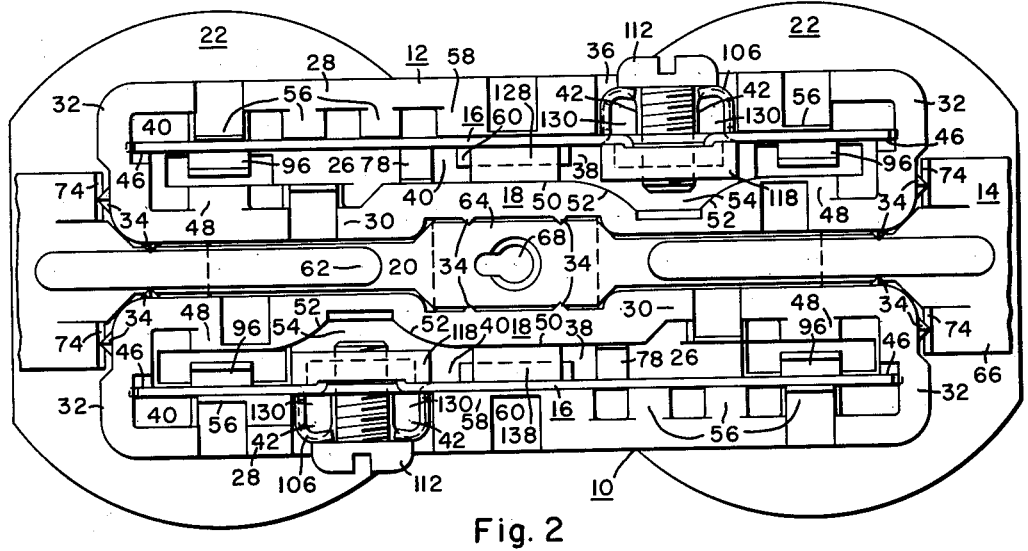
FIG. 2 is a bottom plan view of the receptacle shown in FIG. 1.
Figure 3:
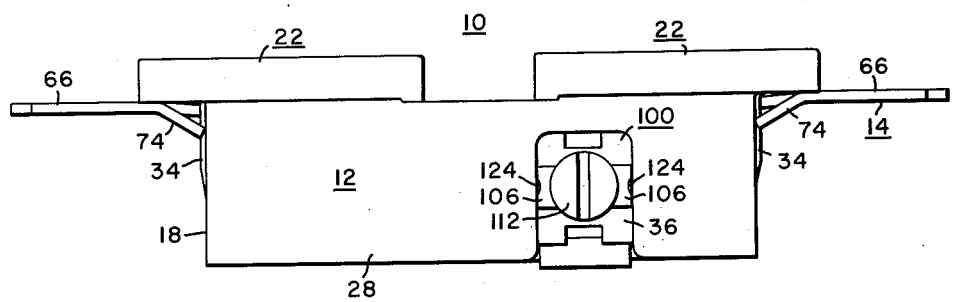
FIG. 3 is an elevation view of the side of the receptacle shown in FIG. 1.

Accordingly, with reference to FIGS. 1 and 2, an electrical receptacle 10 comprises a housing member 12, a mounting member or yoke 14, and terminal members 16. The housing 12 is an integral member molded from a material having insulative and mechanical properties suitable for the functioning of the receptacle 10. Thus, the housing 12 mechanically supports and electrically insulates the terminal members 16, and additionally engages the mounting member 14 so that the receptacle 10 can be suitably supported when placed in use. The housing 12 and the mounting member 14 are similar to structures more fully described in a copending application of S. A. Mason, Serial No. 826,266, filed July 10, 1959, entitled "Wiring Device," and assigned to the present assignee.

The molded housing 12 includes two elongated terminal receiving piers 18 having a channel 20 therebetween. The piers are spanned by faced portions 22, each of which can support an electrical plug (not shown) having prongs that are insertable in slots 24 of the faced portions 22.

Each of the elongated piers 18 is formed substantially as a rectangular parallelepiped having a terminal receiving chamber 26 therein. An outer side wall 28, an inner side wall 30, and oppositely stationed end walls 32 form an irregular peripheral surface for the enclosed chamber 26. Elongated projecting ridges 34 on the inner side wall 30 and the oppositely stationed end walls 32 contribute substantially to the engagement of the mounting member 14 by the housing 12 as described in the previously mentioned copending application. The outer side wall 28 has an opening 36 to provide access to a terminal 16 locked within the pier 18 when the receptacle 10 is fully assembled.

With reference to the chamber 26, a roof 38 has terminal supporting ledges 40, recesses 42, in each of which the end of a wire can be contained, and an opening 44 that facilitates molding of the housing 12. A ridge 46 extends vertically along the inner surface of each end wall for stabilization of an inserted terminal 16 against horizontal movement. Additionally, along the inner side wall 30, there extends a ridge 48 for support of an inserted prong, mention of which has hereinbefore been made, a terminal supporting platform 50, and receding surfaces 52 defining a screw receiving recess 54. The outer side wall 28 includes terminal supporting ridges 56, the previously mentioned opening 36, and a supporting platform 58 for engagement of a terminal 16 through a locking action of a hook-like projection 60 that extends upwardly and outwardly from the platform 58 toward the inner side wall 30.

With reference to FIGS. 1 and 2, the mounting member 14 is formed from a resilient material, such as sheet steel, so that it can be readily secured to the housing 12 in an assembly of the receptacle 10 and thereby suitably adapt the receptacle 10 for mounting on a support (not shown). The mounting member 14 comprises an elongated collar 62 having an expanded middle portion 64 and integral ears 66 at its opposite extremities. The collar 62 has a threaded opening 68 for receiving a fastener for a faceplate (not shown) that can be placed over the receptacle 10 when the receptacle 10 is mounted. Each of the ears 66 has a slot 70, though not of necessity, for relief of any strain attendant to mounting, an opening 72 for a mounting screw and integral cantilever inwardly projecting tabs 74 that serve as means to clamp the mounting member 14 to the housing 12.

Figure 4:
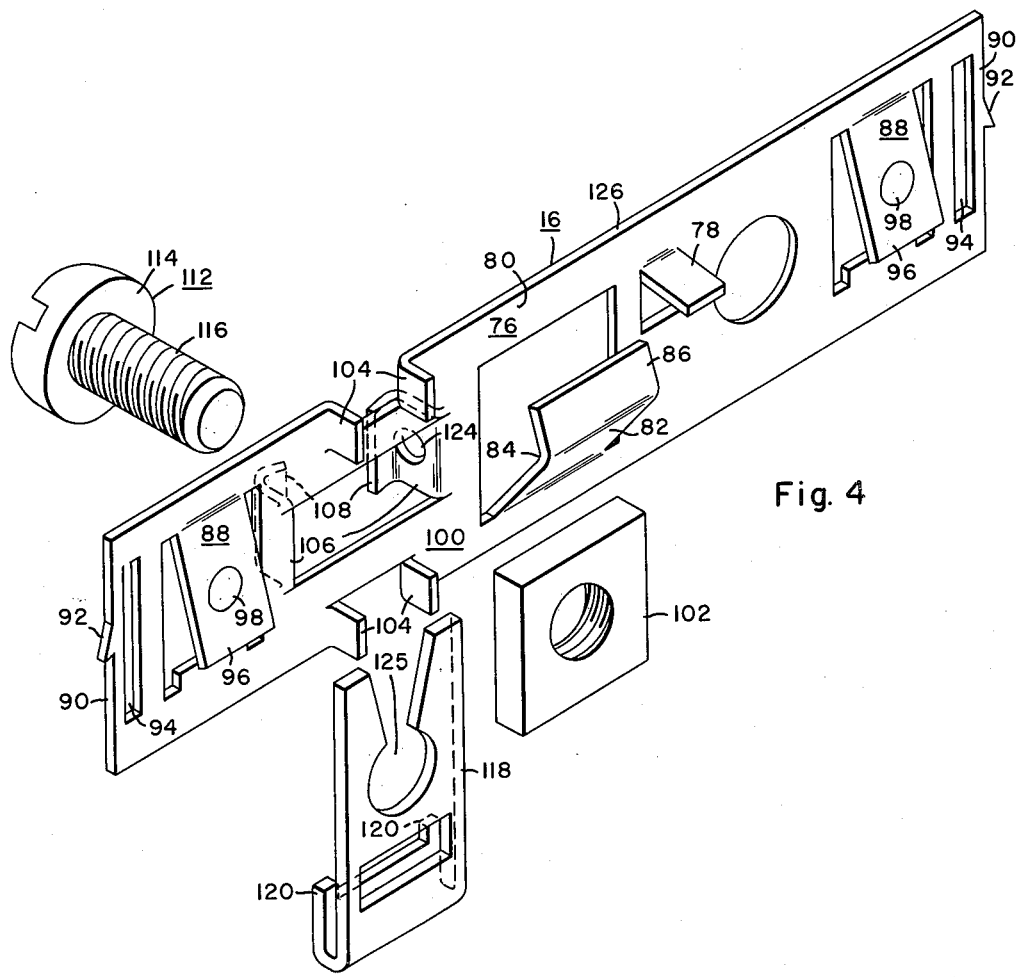
FIG. 4 is an exploded, isometric view of a terminal that is inserted in the receptacle of FIG. 1.

As viewed in FIGS. 2 and 4, the terminal 16 is generally formed for rigid support in the housing 12 and for mechanical and electrical engagement of conductive wires and plug prongs. Because the terminal 16 is stamped from electrically conductive, mechanically resilient material, an electrical connection is made between any engaged plug prongs and wires.

More particularly, the terminal 16 is elongated in order to conform to the elongated chamber 26 in the housing 12. A middle portion 76 of the terminal includes a lanced cantilever tab 78, a strip 80 for locking the terminal 16 over the housing projection 60, and an outwardly extending resilient flap 82 that elbows as indicated by the reference character 84 so that a forearm 86 is inclined inwardly toward the plane of the terminal 16. The tab 78 and the flap 82 stabilize and align the terminal 16 against horizontal movement when it is inserted within the housing 12. Opposite end portions 88 of the terminal 16 include fixed end beams 90 having tangs 92 to compensate for differences in the longitudinal dimensions of the terminal 16 and the chamber 26 and to provide terminal stability in the vertical direction within the chamber 26, slots 94 adjacent to the beams 90 to allow for inward deflection thereof in providing the indicated compensation, and cantilever prong engaging contacts 96, each having a dome-like bump 98 for spanning into a recess ordinarily provided in a plug prong.

An intermediate portion 100 of the terminal is formed to engage mechanically and electrically conducting wires positioned therein through screw-clamping action. In order to retain a screw engaging nut 102 in a stationary position, tabs 104 are formed to extend transversely outwardly from the plane of the terminal 16. Additionally, wire gripping arms 106 are formed to protrude outwardly in the opposite transverse direction in a manner such that an end 108 of each arm 106 is angled slightly inwardly toward the plane of the terminal 16, whereby improved wire gripping is provided through frictional forces arising in arm wrapping action. An intermediate portion of each arm 106 has an opening 124 to facilitate collapse of the arm 106 during wire engagement. A screw 112 with a head 114 and a threaded shank 116 and the screw receiving nut 102 cooperate with the intermediate portion 100 of the terminal 16 in providing the wire engaging feature for the receptacle 10. An insulative member 118, having tab straddling arms 120 and a screw receiving opening 125, can be attached to the terminal 16 when it is inserted in the housing 12 in a manner that will be described more fully hereinafter.

To this point in the description, the structure of the receptacle members has been set forth, and, accordingly, the cooperation between these members in accordance with the principles of the invention remains to be described. The mounting member or yoke 14 is assembled with the housing 12 in a manner more fully described in the aforementioned copending application. Briefly, the mounting member 14 is passed into the channel 20 in the housing 12 against the underside of the faced portions 22. The collar 62 is then rigidly held in the channel 20 while the projecting tabs 74 of the ears 66 will have been bent to bite into the end wall projecting ridges 34 thereby securely attaching the mounting member 14 to the housing 12.

A terminal member 16 is inserted in each of the pier chambers 26 of the housing 12 to be locked therein. Prior to insertion, the nut 102 is positioned adjacent to the terminal tabs 104 and the screw 112 is then threaded into the nut 102. The end of the screw 112 can be staked, of course, to prevent its removal. The terminal 16 is then positioned so that the beams 90 align with the pier end walls 32 and so that an edge 126 of the terminal 16 is leading with the flap elbow 84 aligned with the pier side wall platform 50. As the terminal 16 is inserted in the chamber 26, the tangs 92 slide frictionally along the end walls 32 and cause a central portion of the fixed beams 90 to deflect inwardly thereby providing for dimensional variations between the length of the terminal 16 and the length of the chamber 26. The locking strip 80 concurrently slides upwardly and outwardly along the hook-like projection 60 toward the inner side wall 30 until the terminal member 16 is fully inserted in the chamber 26, at which time the strip 80 snaps over an upper edge 128 of the hook-like projection 60 and brushes downwardly toward the outer side wall 28 along an inclined surface of the projection 60 to a position against the roof 38 and the terminal supporting platform 58 of the housing 12. The terminal flap 82 is then fixed against the inner side wall platform 50 and the terminal tab 78 can be deformed to a similar position. Additionally, the end beams 90 are fixed against the end wall terminal supporting ledges 46 in a manner such that the terminal 16 is clamped within the housing 12. Reference is made to the previously mentioned copending application for a more thorough description of the manner in which the terminal 16 is clamped or locked within the housing.

The inserted and locked terminals 16 cooperate with the housing to provide for the electrical functioning of the receptacle 10. Accordingly, each of the cantilever contacts 96 of the terminal 16 cooperate with its adjacent housing ridge 48 to engage mechanically a plug prong. The wire receiving means of the terminal 16 is positioned adjacent to the pier recess 54 so that the screw head 114 horizontally extends through the side wall opening 36 where access can be had thereto. Each of the terminal arms 106 cooperates with the screw shank 116 and portion 100 of terminal 16 to define a passage 130 through which a wire can be passed. Thus, each terminal 16 has the capacity for engaging two wires. The leading end of a wire slipped through one of the passages 130 is limited in entering movement by the roof recess 42 aligned with the passage 130.

Such a wire is then engaged by the terminal 16 simply by tightening the screw 112. Since the nut 102 is held stationary by the terminal nut retaining tabs 104, the screw action causes a collapsing effect on each underset terminal arm 106. Because the ends 108 of the arms 106 are formed to point initially somewhat toward the plane of the terminal 16, the arms 106, in collapsing, wrap around any contained wire with considerable facility. It is not necessary, however, for the arm ends 108 to be pointed as described, for they can point in a direction parallel to the plane of the terminal 16 or even at an angle away from the plane of the terminal 16 without impairing the wire engaging function of the receptacle 10. Collapse of each of the arms 106 is also facilitated by the presence of the arm opening 124. Under the crushing effect of the screw the arm 106 bends or buckles along its entire longitudinal axis rather than preferentially at the junction of the arm 106 with the plane of the terminal 16 because of the weakened transverse sections containing the opening 124. When the screw 112 is substantially tightened, the arm 106 will have collapsed to wrap around any contained wire and thereby to clamp the wire against the terminal 16.

In order to prevent the entrance of wires into the side wall recess 54 and the general vicinity of the terminal intermediate portion 100 for accordance with underwriters' specifications, the previously described insulative member 118 can be inserted into the housing 12. In particular, the insulator 118 is passed into the chamber 26 so that the end of the screw shank 116 is forced into the insulator opening 125 whereupon the insulator arms 120 will straddle the lowermost terminal nut retaining tabs 104.

In view of the foregoing description, it is obvious that the receptacle or wiring device 10 is readily assembled from a minimum number of functional parts without the employment of separate securing elements. As a result, costs are reduced while the intended functionality remains and is even generally improved. The bottoms of the piers are open, but a cover can be provided therefor.

A second copending application of S. A. Mason, Serial No. 826,218, Westinghouse Electric Corporation Case 31,420, filed July 10, 1959, entitled "Wiring Device," and assigned to the present assignee, to which reference is made, describes the principles of operation for such a cover.

As previously noted, the physical arrangement described herein is merely an exemplary embodiment of the invention, and, accordingly, it is desired that the invention be not limited by this embodiment but be accorded an interpretation consistent with the scope and spirit of its broad principles.

What is claimed is:

1. An electrical receptacle including a unitary insulative housing, at least one conductive terminal being insertable through an open side of said housing, means for supporting said terminal relative to said housing, spaced elongated arms extending transversely from one side of said terminal, and a threaded fastener having a head positionable against the arm end portions and having a portion thereof extending into the space between the arms to define wire receiving passages between each of said arms, respectively, and the extending portion of said fastener, means for enabling said fastener to be tightened in threaded relation against said one terminal side so as to affect a clamping engagement of said arms against an inserted wire, said enabling means including a nut positioned on the side of said terminal opposite said one side and spaced tabs extending outwardly from said opposite side of said terminal to hold said nut against rotation, and an insulative member having tab-like arms for engagingly straddling at least two of said spaced terminal tabs and an upper portion for engagingly straddling the end of said threaded fastener so as to preclude substantially the entry of wires through said open side of said housing and adjacently of said terminal opposite side.

2. An electrical receptacle including a unitary insulative housing, at least one conductive terminal being insertable through an open side of said housing, means for supporting said terminal relative to said housing, means for engaging a wire with said terminal, said wire engaging means including a threaded fastener having a head portion for retaining said wire against one side of said terminal, said fastener also having a threaded portion extending through said terminal, and a nut positioned on the side of said terminal opposite said one side and spaced tabs extending outwardly from said opposite side of said terminal to hold said nut against rotation, and an insulative member having tab-like arms for engagingly straddling at least two of said spaced terminal tabs and an upper portion for engagingly straddling the end of said threaded fastener so as to preclude substantially the entry of wires through said open side of said housing and adjacently of said terminal opposite side.

References Cited in the file of this patent

UNITED STATES PATENTS

| | | |
|---|---|---|
| 1,830,466 | Hines | Nov. 3, 1931 |
| 2,358,132 | Paucek | Sept. 12, 1944 |
| 2,406,079 | Krueger | Aug. 20, 1946 |
| 2,686,297 | Hutt | Aug. 10, 1954 |
| 2,690,545 | Hubbell | Sept. 28, 1954 |
| 2,723,385 | Benander | Nov. 8, 1955 |
| 2,898,573 | Lamb | Aug. 4, 1959 |